United States Patent [19]

Carey Smith et al.

[11] Patent Number: 4,979,036
[45] Date of Patent: Dec. 18, 1990

[54] TELEVISION MOTION DETECTION ARRANGEMENT

[75] Inventors: Christopher M. Carey Smith; Franciscus W. P. Vreeswijk, both of Eindhoven, Netherlands

[73] Assignee: U.S. Philips Corporation, New York, N.Y.

[21] Appl. No.: 356,037

[22] Filed: May 23, 1989

[30] Foreign Application Priority Data

May 31, 1988 [NL] Netherlands ................. 8801386
Sep. 16, 1988 [GB] United Kingdom ............ 8821764

[51] Int. Cl.$^5$ ................ H04N 7/18; H04N 9/64; H04N 5/14
[52] U.S. Cl. ........................... 358/105; 358/21 R; 358/160
[58] Field of Search .............. 358/105, 160, 21 R

[56] References Cited

U.S. PATENT DOCUMENTS

| | | | |
|---|---|---|---|
| 4,625,239 | 11/1986 | Vroeswijk et al. | 358/105 |
| 4,639,773 | 1/1987 | Hurst | 358/105 |
| 4,641,180 | 2/1987 | Richter | 358/105 |
| 4,703,358 | 10/1987 | Flannaghan | 358/105 |
| 4,733,297 | 3/1988 | Katsumata et al. | 358/105 |
| 4,740,842 | 4/1988 | Annegarn et al. | 358/105 |
| 4,845,560 | 7/1987 | Kondo | 358/105 |

*Primary Examiner*—John K. Peng
*Attorney, Agent, or Firm*—Edward W. Goodman

[57] ABSTRACT

A television picture memory (MEM) containing digital picture signal values associated with picture elements (PIX) is coupled via a picture signal value comparison circuit (COM1) and an absolute value circuit (ABS1) to an adaptive threshold circuit (THR) for the picture signal differences. In order to obtain a motion detection with a directional sensitivity in the horizontal and vertical direction, the threshold circuit (THR) has an adaptive horizontal and vertical threshold value - adapting circuit (ADA) which produces the adaptive threshold values (HI and VI) via maximum value passing circuits (H MAX and V MAX) which are coupled to the memory (MEM) via an absolute value circuit (ABS2), a picture signal comparison circuit (COM2) and a signal combining circuit (AVE2), and by-passing it. The comparison circuit (COM2) is operative for the horizontal threshold value (HI) with picture elements in the line direction which are more or less adjacent to an instantaneous picture element and picture element values which are derived via the signal combining circuit (AVE2) from the picture elements of one of the more or less adjacent, superjacent or underlying lines belonging to the instantaneous, preceding or subsequent field period. The comparison circuit (COM2) is operative for the vertical threshold value (VI) with picture elements in the field direction that are more or less adjacent to the instantaneous picture element and picture element values which are derived via the combining circuit (AVE2) from the picture elements of one of the more of less adjacent, superjacent or underlying lines belonging to the instantaneous, preceding or subsequent field period.

9 Claims, 5 Drawing Sheets

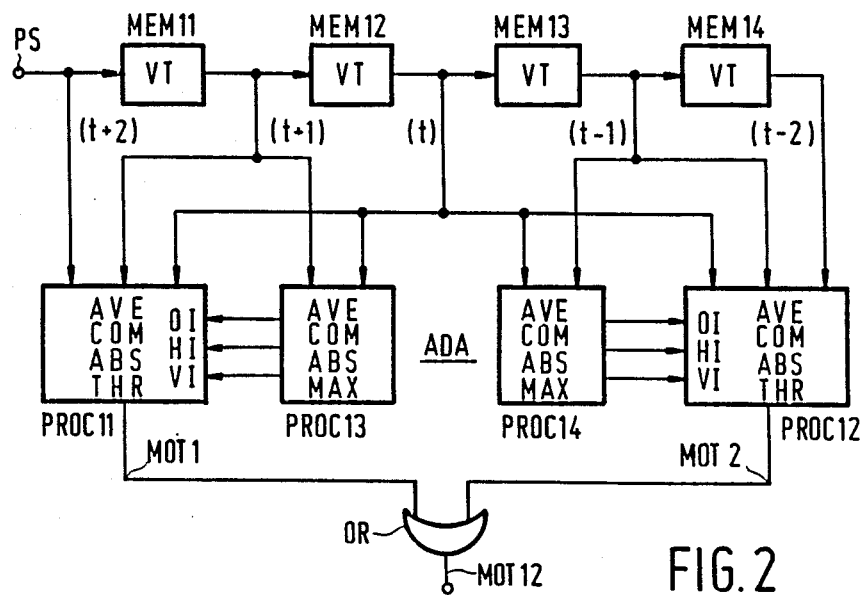
FIG.2
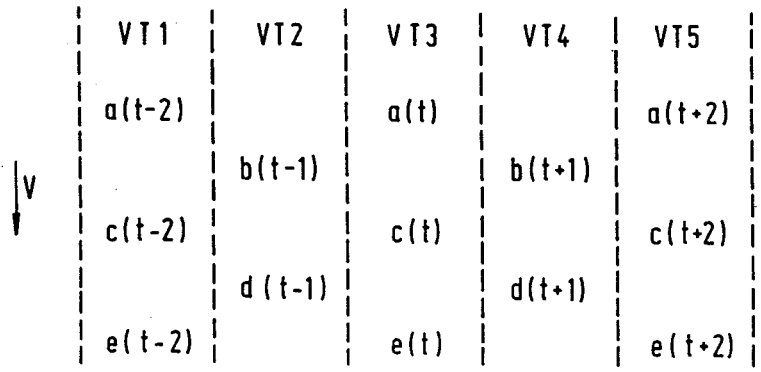
FIG.3
| b1(t-1) | b2(t-1) | b3(t-1) | | b1(t+1) | b2(t+1) | b3(t+1) |
| c1(t) | [c2](t) | c3(t) | | c1(t) | [c2](t) | c3(t) |
| d1(t-1) | d2(t-1) | d3(t-1) | | d1(t+1) | d2(t+1) | d3(t+1) |
FIG.4a          FIG.4b

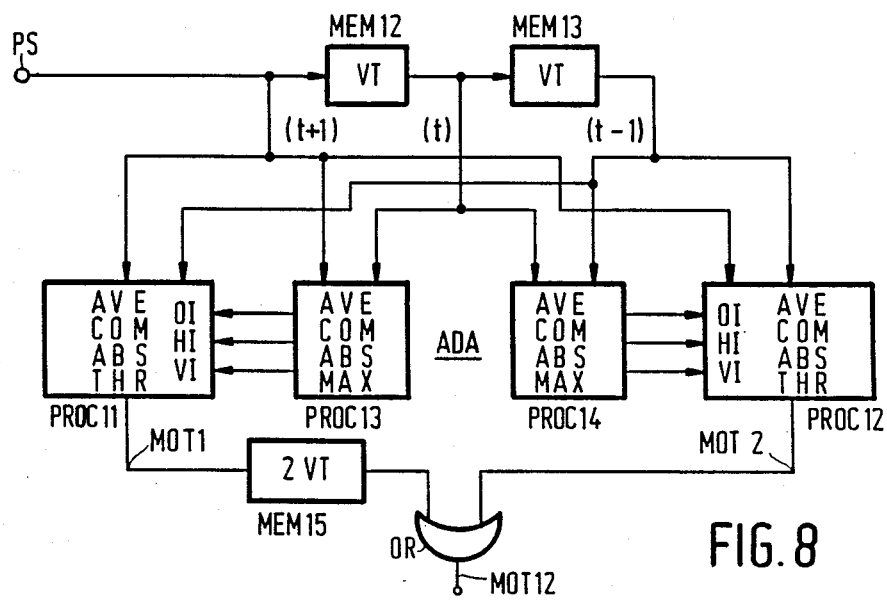
FIG. 8
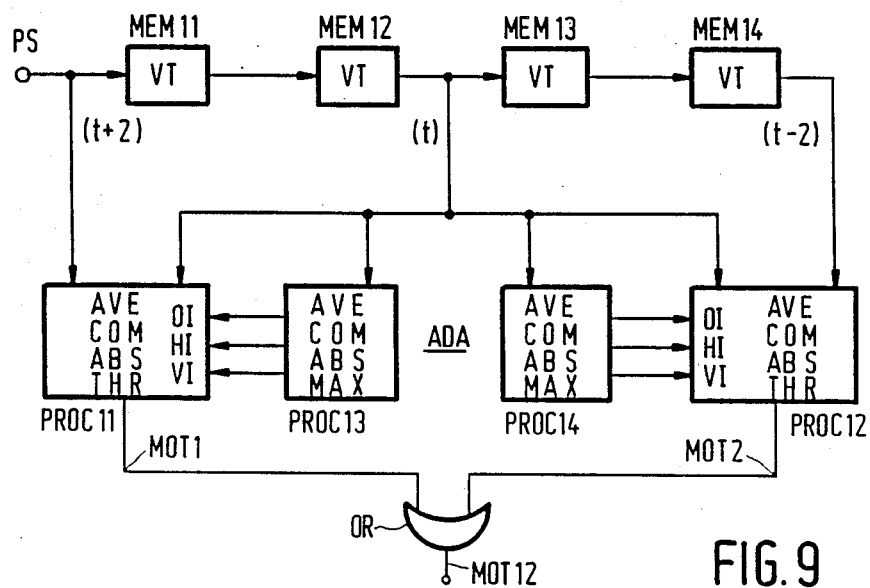
FIG. 9
| $a0(t)$ | $a2(t)$ | $a4(t)$ |
| --- | --- | --- |
| $c0(t)$ | $\boxed{c2}(t)$ | $c4(t)$ |
| $e0(t)$ | $e2(t)$ | $e4(t)$ |
FIG. 10

$(-y2)(t)$     $y2(t)$     $y6(t)$ $(-c2)(t)$     $\boxed{c2}(t)$     $c6(t)$ $(-g2)(t)$     $g2(t)$     $g6(t)$

FIG. 11

$(-w4)(t)$     $w2(t)$     $w8(t)$ $(-c4)(t)$     $\boxed{c2}(t)$     $c8(t)$ $(-i4)(t)$     $i2(t)$     $i8(t)$

FIG. 12

$w2(t)$ $(-y2)(t)$     $y6(t)$ $(-c4)(t)$     $\boxed{c2}(t)$     $c8(t)$ $(-g2)(t)$     $g6(t)$ $i2(t)$

FIG. 13

TELEVISION MOTION DETECTION ARRANGEMENT

BACKGROUND OF THE INVENTION

1. Field of the Invention

The invention relates to a television motion detection arrangement having at least one television picture store for storing digital picture signal values related to picture elements of an interlaced television picture which on display is formed line-sequentially or horizontally and field-sequentially or vertically, a frame period comprising several field periods, and further including a picture signal value comparison circuit whose inputs are coupled to at least outputs of the store containing the picture signal values for producing picture signal value differences, to an absolute-value circuit coupled to outputs of the comparison circuit for supplying the picture signal value differences, to an adaptive threshold circuit coupled to outputs of the absolute-value circuit and to a threshold value-adapting circuit an output of which is coupled to a threshold value input of the adaptive threshold circuit for the supply of a threshold value which depends on the picture signal value differences, exceeding the adaptive threshold value being an indication of motion.

Such a motion detection arrangement can be used for various purposes. In the event of a television transmission channel having a bandwidth which is more limited than that of the television signal source, the motion detection can be used for bandwidth reduction. In the conversion of a television signal from one standard to another, the motion detection can be used to obtain an improved picture quality on display of the converted picture signal. In addition, the motion detection can be used during motion compensation for the case of a moving television camera. In all cases the detection can be combined with estimating the degree and/or the direction of the motion at a picture element of the television picture, considered or not considered across subregions of the television picture which comprise several, surrounding picture elements.

In all cases an appropriate detection whether there is motion or no motion in whatever degree or direction, is of basic importance. The adaptive structure of the threshold circuit results in known manner in an improved detection. Then, the adaptation can be effected on the basis of the picture signal value difference between an instantaneous picture element and the corresponding picture element one picture period earlier or earlier and later. However, at the occurrence of, on the one hand, details in the television picture having a high spatial frequency and, on the other hand, rapid motion corresponding to a high temporal frequency, it is still possible that faulty decisions as regards motion are taken, which, on display of the picture signal, results in an impermissible loss in picture quality. In practice, it has been found that a rapid motion transversely of a detail having a high spatial frequency may result in such a loss in quality.

SUMMARY OF THE INVENTION

The invention has for its object to provide a motion detection arrangement with an optimum detection of whether there is motion or no motion in the cases described, its specific object being to prevent an incorrect motion detection. According to the invention, a television motion detection arrangement is characterized, in that the adaptive threshold circuit has at least a horizontal or vertical threshold-value input coupled to an output of a horizontal or vertical maximum-value pass circuit, respectively, which forms part of the threshold value-adapting circuit, inputs of which are coupled via an absolute-value circuit to outputs of a picture signal value comparison circuit which, via a signal combining circuit and by-passing this circuit, is coupled to outputs of the picture store, said last picture signal value comparison circuit being operative for the horizontal maximum-value pass circuit with, relative to an instantaneous picture element, more or less adjacent picture elements in the line or horizontal direction and picture element values which are derived via the signal combining circuit from the picture elements of one of the more or less adjacent, superjacent or underlying lines belonging to the instantaneous, preceding or subsequent field period and also for the maximum-value pass circuit with, relative to the said instantaneous picture element, more or less adjacent picture elements in the field or vertical direction and picture element values which are derived via the signal combining circuit from the picture elements of one of the more or less adjacent, superjacent or underlying lines belonging to the instantaneous, preceding or subsequent field period.

As a result thereof a directional sensitivity in the horizontal and vertical direction is introduced during the motion detection, which results in a more accurate detection whether there is motion or no motion.

BRIEF DESCRIPTION OF THE DRAWINGS

The invention will now be described in greater detail by way of example with reference to the accompanying drawings, in which:

FIG. 2 is a further block circuit diagram of a detection arrangement operative with a preceding and a subsequent television field or picture, respectively;

FIG. 3 shows, to explain the mode of operation of the arrangement, five television lines a, b, c, d and e during five field periods VT;

FIGS. 4a and 4b show three picture elements 1, 2 and 3 of each television line b, c and d of FIG. 3;

FIG. 8 is a further block circuit diagram for a detection arrangement operating with three fields $(t-1)$, $(t)$ and $(t+1)$ having single interlace;

FIG. 9 is a different block circuit diagram associated with a mode of an operation with three fields $(t-2)$, $(t)$ and $(t+2)$, the treshold value-adapting circuit being operative with only the instantaneous field $(t)$;

FIG. 10 shows three picture elements 0, 2 and 4 of each television line a, c and e of FIG. 3; and FIGS. 11, 12 and 13 show in mutually comparable ways television lines and picture elements by way of illustration of possible treshold value adaptations having more or less adjacent picture elements.

DESCRIPTION OF THE PREFERRED EMBODIMENTS

Figure 1:
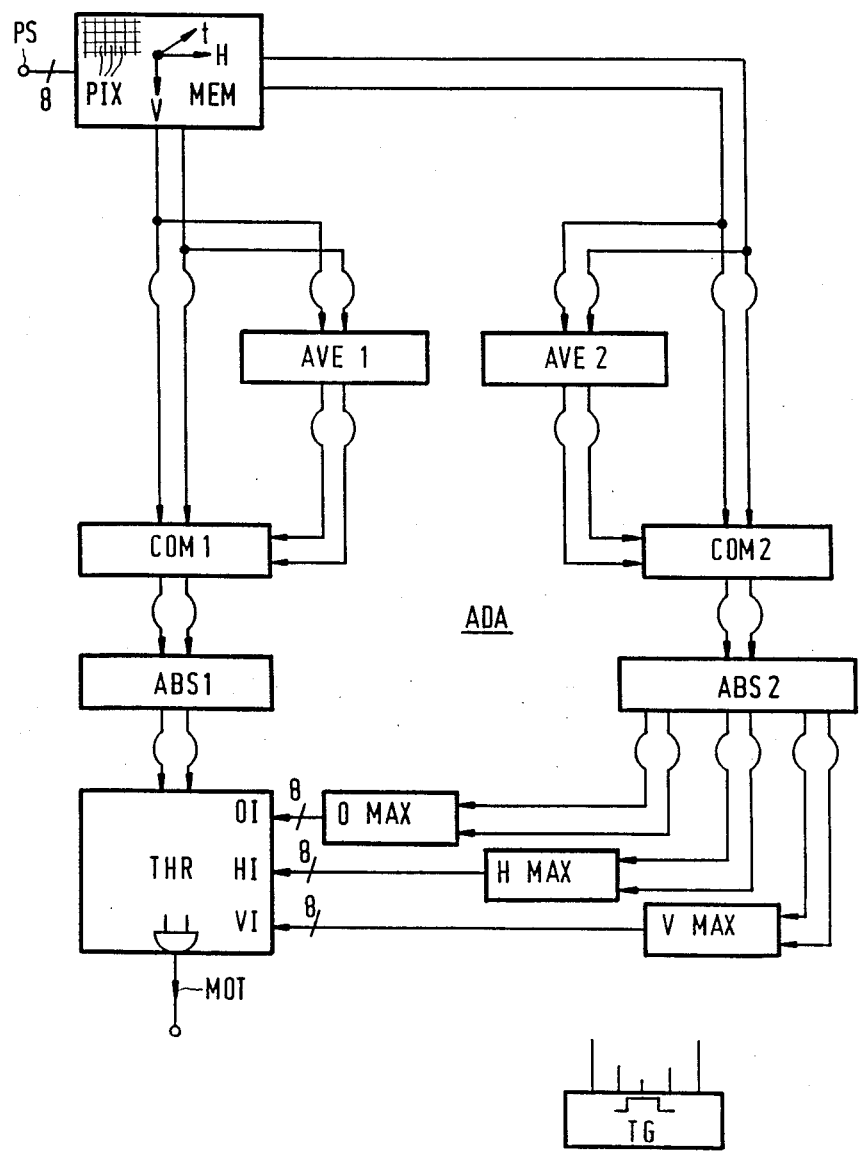
FIG. 1 is a block circuit diagram of an embodiment of a television motion detection arrangement according to the invention.

In the embodiment of a television motion detection arrangement according to the invention, shown in a block circuit diagram in FIG. 1, reference MEM denotes a television picture memory. In single-interlaced television, in which a television frame period comprises two field periods, the memory MEM may comprise two field memories. Three field memories may be provided when the information about a television picture is obtained from two field memories, while the third field memory is being written. In the case of a motion detection based on a preceding and a subsequent television picture relative to an instantaneous field of picture elements, four or five field memories may then be present in the memory MEM. For this situation FIG. 2 shows a detection arrangement having four field memories MEM11, MEM12, MEM13 and MEM14, each having a time delay of one field period VT. Independent of the number of field memories in the memory MEM, this memory is assumed to be a digital memory, to which a digitized picture signal PS is applied via an 8-bit input. The picture signal PS is assumed to be assembled line-sequentially (or horizontal) and field-sequentially (or vertical) in known manner, which on display provides an interlaced television picture. In this situation, the television picture consists of picture elements for which corresponding storage elements are denoted by PIX at the memory MEM. In addition, H indicates the horizontal or line direction and V indicates the vertical or field direction, t representing time.

In known manner, multiple outputs of the memory MEM are coupled to inputs of a picture signal value comparison circuit COM1. In addition, the memory MEM and the circuit COM1 are coupled via a signal combining circuit AVE1, which, as will be described hereinafter, is designed as an average-value circuit. Independent of the structure of the memory MEM, the comparisons are effected in the circuit COM1, for an instantaneous picture element PIX, the picture signal value being compared with, for example, that of the corresponding picture element PIX of the preceding or the subsequent television picture, it further being possible that more or less adjacent, surrounding picture elements are involved in the comparison. TG in FIG. 1 denotes a time signal generator for applying, for example, clock pulses to the memory MEM, the circuit COM1 and circuits still further to be described hereinafter. For simplicity of the drawing, the connections from the time signal generator TG to the different components of the arrangement are omitted. The drawing shows that the inputs of the circuit COM1 are coupled to outputs of the memory MEM, but the input carrying the picture signal PS can directly be connected to the circuit COM1.

The circuit COM1 is followed by an absolute-value circuit ABS1. The circuit ABS1 applies the positive and negative picture signal value differences, originating from the circuit COM1, with the same, fixed polarity to an adaptive threshold circuit THR. The circuit THR has, in known manner, a threshold value-input OI coupled to an output of the threshold value-adapting circuit ADA. The threshold value, which is alternatively denoted as OI, depends on the magnitude of the picture signal value differences and exceeding the threshold value results in motion being detected. For each element PIX, the circuit THR provides, in an output signal MOT, the information that motion is detected or not detected, respectively, which is represented by, for example a logic 1 or a logic 0, respectively. This information can be obtained not only via the element-to-element comparison described but also by means of a comparison with surrounding picture elements, for example in a predetermined sub-region of the television picture. The degree of motion and its direction could moreover be determined. Independent of the specific implementation of the motion detection together with its degree and/or direction, the circuit THR is further provided, in accordance with a feature of the invention, with a horizontal and a vertical threshold value input HI and VI, respectively, to which corresponding outputs of the threshold value-adapting circuit ADA are connected. By way of example, the drawing shows 8-bit inputs OI, HI and VI, the respective threshold values having been given the same indications.

The threshold value-adapting circuit ADA in accordance with the invention is provided, as is shown in FIG. 1, with a signal combining circuit AVE2, constituted, for example by an average-value circuit, coupled to the memory MEM. Outputs of the memory MEM are coupled via the circuit AVE2 and by-passing it to inputs of a picture signal value comparison circuit COM2, which is followed by an absolute-value circuit ABS2. The circuit ABS2 is shown as having three groups of outputs which are coupled via maximum-value pass circuits V MAX, H MAX and O MAX to the respective threshold value inputs VI, HI and OI.

To explain how the arrangement shown in FIG. 1 operates, five field periods are denoted in FIG. 3 by VT1 to VT5, inclusive, five interlaced television lines are denoted by a, b, c, d and e. VT3 denotes an instantaneous field period by (t), the times $(t-1)$ and $(t-2)$ belonging to the two preceding field periods VT2 and VT1 and the times $(t+1)$ and $(t+2)$ belonging to the two subsequent field periods VT4 and VT5. As was also the case for the memory MEM of FIG. 1, V denotes the vertical direction. Let it be assumed in this situation in FIG. 3 that the memory MEM comprises four or five field memories for supplying the picture signal belonging to the five field periods. FIG. 2 relates to the design having four memories constituted by delay devices.

In FIGS. 4a and 4b three picture elements are shown for each television line b, c and d of FIG. 3 denoted by 1, 2 and 3. The instantaneous picture element is represented by $c2(t)$ and a square. The adjacent picture elements in the horizontal direction are denoted by $c1(t)$ and $c3(t)$. The adjacent picture elements in the vertical direction are denoted by $b2(t-1)$ and $d2(t-1)$ in FIG. 4a and by $b2(t+1)$ and $d2(t+1)$ in FIG. 4b. Picture elements of the superjacent and underlying line corresponding to the picture element $c1(t)$ and $c3(t)$, are denoted by $b1, b3$ and $d1, d3$, respectively, more specifically for the preceding field $(t-1)$ and the subsequent field $(t+1)$.

Figure 5A:
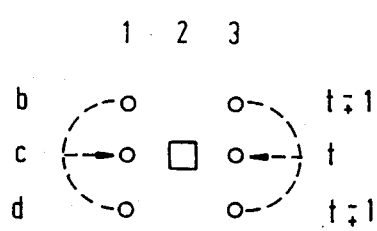
FIGS. 5a and 5b illustrate the derived values of the adaptive horizontal and vertical threshold value, respectively.
Figure 5B:
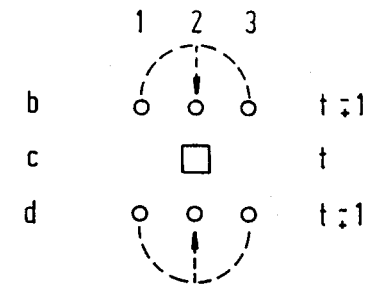

FIGS. 5a and 5b are associated with the derivation of the adaptive horizontal and vertical threshold value, respectively, for the fields (t) and $(t-1)$ or (t) and $(t+1)$. The horizontal threshold value is obtained via the circuit H MAX, ABS2, COM2 and AVE2 in accordance with the following relation: the *maximum* of $$|c2(t)-c1(t)|,$$

$$|c2(t)-c3(t)|,$$

$$|c2(t)-\tfrac{1}{2}(b1(t-1)+d1(t-1))| \text{ and}$$

$$|c2(t)-\tfrac{1}{2}(b3(t-1)+d3(t-1))|$$

is allowed to pass, wherein $|\ldots|$ denotes the absolute value, the minus sign is part of the comparison and $\tfrac{1}{2}(\ldots +\ldots)$ is part of the picture element combination, here in the form of taking an average value. Replacing $(t-1)$ by $(t+1)$ provides the relation for the subsequent field instead of the preceding field. In FIG. 5a the influence of the value averaging operation is illustrated by means of the broken lines. It was found that the horizontal maximum-value pass circuit H MAX is operative with, relative to the instantaneous picture element $c2(t)$, adjacent picture elements $c1(t)$ and $c3(t)$ in the horizontal direction and picture elements corresponding thereto which are derived by means of the signal combining circuit AVE2 from the respective picture elements b1 and b3 of the superjacent line and d1 and d3, respectively of the underlying line, belonging to the preceding $(t-1)$ or the subsequent $(t+1)$ field period.

The vertical threshold value is obtained in accordance with the following relation: the *maximum* of $$|c2(t)-b2(t-1)|$$

$$|c2(t)-d2(t-1)|$$

$$|c2(t)-\tfrac{1}{2}(b1(t-1)+b3(t-1))| \text{ and}$$

$$|c2(t)-\tfrac{1}{2}(d1(t-1)+d3(t-1))|$$

is passed. Also here $(t-1)$ may be replaced by $(t+1)$. In FIG. 5b the influence of the value averaging operating is illustrated by the broken lines. It was found that the vertical maximum-value pass circuit V MAX is operative, relative to the instantaneous picture element $c2(t)$, with adjacent picture elements b2 and d2 and picture elements corresponding thereto which are derived by means of the signal combining circuit AVE2 from the picture elements preceding them in the same lines, b1 and d1, respectively, and which follow in the same line, b3 and d3, respectively, the said picture elements being part of the preceding $(t-1)$ or subsequent $(t+1)$ field period.

For the sake of completeness, it should be noted that the circuit O MAX allows the maximum to pass of the absolute values of the picture value differences between the instantaneous picture element $c2(t)$ and each of the surrounding picture elements b, c and d.

The use at the threshold values HI and VI of the directional sensitivity in the horizontal and vertical direction, results, in practice, in a more accurate decision in the detection whether there is indeed motion. The direction-sensitive threshold values are then, for example, superimposed on a minimum threshold value which is determined by the noise level.

Figures 6A, 6B, 6C:
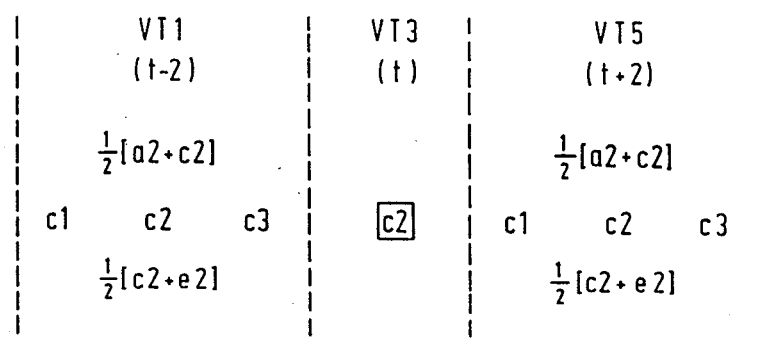
FIGS. 6a, 6b and 6c show some picture elements c and interpolated picture elements $\frac{1}{2}[a2+c2]$ and $\frac{1}{2}[c2+e2]$ during three field periods VT1, VT3 and VT5.
Figure 7:
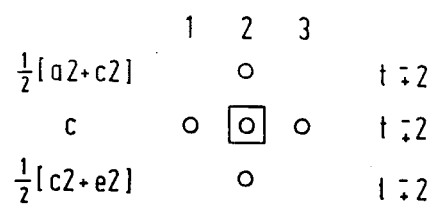
FIG. 7 has for its object to give an illustration of a manner in which a conclusion can be made that there is indeed motion or no motion, respectively, via the adaptive horizontal and vertical threshold value.

A still further measure consists in that, in the presence of the adaptive horizontal and vertical threshold value HI and VI, respectively, the threshold circuit THR is provided with a gate circuit having a logic AND-function so that the detection there is motion is only obtained if the absolute values of all the picture signal value differences applied for the instantaneous picture element $c2(t)$, exceed one of the threshold values (OI, HI and VI). In FIG. 1 an AND-gate is shown by way of illustration at the output of the threshold circuit THR. FIGS. 6a, 6b and 6c relate to three field periods VT1$(t-2)$, VT3$(t)$ and VT5$(t+2)$. FIG. 6b shows the instantaneous picture element c2 in the form of a square. The field which, as is shown in FIG. 6a, occurs two field periods VT earlier and the field which, as is shown in FIG. 6c, occurs two field periods VT later, are represented by the picture elements c1, c2 and c3, picture elements obtained by interpolation or signal averaging by the circuit AVE1 being denoted by $\tfrac{1}{2}[a2+c2]$ and $\tfrac{1}{2}[c2+e2]$. The said (interpolated) picture elements are represented in FIG. 7 by circles. For the fields $(t)$ and $(t-2)$, it is decided that there is indeed motion if the following logic AND-relation applies:

$$|c2(t)-c1(t-2)|>HI$$

$$\text{AND } |c2(t)-c3(t-2)|>HI$$

$$\text{AND } |c2(t)-\tfrac{1}{2}\{a2+c2\}(t-2)|>VI$$

$$\text{AND } |c2(t)-\tfrac{1}{2}\{c2+e2\}(t-2)|>VI$$

$$\text{AND } |c2(t)-c2(t-2)|>OI$$

For the fields $(t)$ and $(t+2)$, it is necessary that in the AND-relation $(t-2)$ is replaced by $(t+2)$.

On the basis of the above AND-relation, the conclusion that motion is indeed detected is only taken on very good grounds since all the picture signal value differences applied for the instantaneous picture element $c2(t)$ to the circuit THR by the circuit COM1 must exceed one of the threshold values HI, VI and OI.

The arrangement shown in FIG. 1 is operative with preceding or subsequent field and frame periods. FIG. 2 shows an arrangement which is operative with preceding and subsequent field and frame periods. The input carrying the picture signal PS is coupled to the series arrangement of four memories MEM11 to MEM 14, inclusive, which act as delay devices, each producing a time delay equal to the field period VT. Starting from the instantaneous field $(t)$ the two preceding fields $(t-1)$ and $(t-2)$ and the two subsequent fields $(t+1)$ and $(t+2)$ are simultaneously available for processing. PROC11 and PROC12, respectively, denote signal processing circuits comprising the circuits AVE1, COM1, ABS1 and THR of FIG. 1. PROC13 and PROC14, respectively, are signal processing circuits comprising the circuits AVE2, COM2, ABS2, O MAX, H MAX and V MAX. PROC13 and PROC14, respectively, are operative with the fields $(t)$, $(t+1)$ and $(t)$, $(t-1)$, respectively, as described for FIG. 2. A respective output MOT1 and MOT2 carrying the decision that motion is detected (logic 1) or that no motion is detected (logic 0) is coupled to an input of a logic OR-gate, denoted by OR, an output MOT12 carrying the ultimate decision whether motion is indeed detected or not.

In the manner described, the arrangement is of a dual construction, the coupling of the components of a dual construction (PROC11+PROC13) and (PROC1 PROC14) results in practice, in a more accurate detection because of the logic OR-function for obtaining the indication that motion is indeed detected (logic 1). In the event in which the detection that there is indeed motion corresponds to the logic 0, the logic OR-function can be realized by replacing the OR-gate by a NAND-gate.

FIG. 8 is a block circuit diagram of a detection device which is operative with three fields, as is indicated by three field periods $(t-1)$, $(t)$ and $(t+1)$. Components already described with reference to FIGS. 1 and 2 are given the same reference numerals in FIG. 8 and in the subsequent FIG. 9. FIG. 8 shows two memories MEM12 and MEM13, the signal processing circuits PROC being operative with the following fields (t−1), (t) and (t+1): PROC11 and PROC12 with fields (t−1) and (t+1), PROC13 with fields (t) and (t+1) and PROC14 with fields (t−1) and (t). The output MOT1 operates via a memory MEM15 as a delay device having a time delay equal to 2 VT, coupled to the gate OR. Instead of the memories MEM11 and MEM14 of FIG. 2, the memory MEM15 is used in accordance with FIG. 8. This provides a cheaper construction as the memories MEM11 (VT) and MEM14 (VT) suitable for storing and supplying the digitized picture signal PS are replaced by the memory MEM15 (2 VT) which has a more limited storage capacity and is suitable for storing and supplying the information that there is indeed (logic 1) and no motion detection (logic 0), respectively.

The use of the memory MEM15 results in that the detection device of FIG. 8 operates with the preceding and the subsequent field period. By way of illustration and by way of example, let it be assumed that on processing of the field sequence (t−1)=3, 4 etc. and (t+1)=5, 6, etc., the outputs MOT2 and MOT1 carry motion information about the fields 3, 5 and 4, 6, respectively, etc. and the memory MEM15 supplies the motion information about the respective fields 1, 3 and 3, 4, etc. It appears that the field 3 and 4, respectively, etc. is compared to the fields 1, 5 and 2, 6, respectively, etc.

FIG. 9 is a block circuit diagram of a detection device operative with three fields (t−2), (t) and (t+2), the threshold value-adapting circuit ADA(PROC13, PROC14) being operative with only the instantaneous field (t).

FIG. 10 shows in a manner comparable to FIG. 4a or 4b, some picture elements, reference being made to FIG. 3 for their relative positions. In FIG. 10 the instantaneous picture element c2(t) is not flanked by direct adjacent picture elements (FIGS. 4a and 4b), c1(t) and c3(t), but by further adjacent picture elements c0(t) and c4(t) next thereto. In the vertical direction, the picture elements are not used of the direct superjacent and subjacent lines (FIGS. 4a and 4b, lines b and d) but from the further adjacent lines a and e next thereto. FIG. 10 shows the picture elements a0(t), a2(t), a4(t) and e0(t), e2(t), e4(t). It appears that in both the horizontal and the vertical directions, the instantaneous picture element c is not compared to the directly adjacent but to the picture elements located next thereto.

In the manner described with reference to FIG. 5a, the adaptive horizontal threshold values is obtained in accordance with the following relation: the *maximum* of $$|c2(t)-c0(t)|,$$

$$|c2(t)-c4(t)|,$$

$$|c2(t)-\tfrac{1}{2}(a0(t)+e0(t))| \text{ and}$$

$$|c2(t)-\tfrac{1}{2}(a4(t)+e4(t))|$$

is passed.

In the manner described with reference to FIG. 5b, the adaptive vertical threshold value is obtained in accordance with the following relation: the *maximum* of:

$$|c2(t)-a2(t)|,$$

$$|c2(t)-e2(t)|,$$

$$|c2(t)-\tfrac{1}{2}(a0(t)+a4(t))| \text{ and}$$

$$|c2(t)-\tfrac{1}{2}(e0(t)+e4(t))|$$

is passed.

In connection with FIG. 10, the FIGS. 11, 12 and 13 show picture element combinations having less adjacent picture elements in both the horizontal and the vertical direction. The picture elements are plotted in mutually comparable manner on the same distance scale. Starting from the lines a, c, e etc. in a field of FIG. 3, let it be assumed that for the FIGS. 11, 12 and 13, the line sequence: w, y, a, c, e, g, i etc. is used as a starting point. The numeration used of the picture elements 1, 2 and 3 (for example c1, c2, c3) along the lines is extended to: (−4), (−3), (−2), (−1), 0, 1, 2, 3, 4, 5, 6, 7, 8.

FIG. 11 shows that the line c is compared to the lines y and g. Three lines are present between the lines c and y, and c and g. These are the respective line a and e of its own field and the respective lines b, z and d, f from the other field of the picture, assuming there is there a line sequence of: x, z, b, d, f, h, j, etc. In each line three picture elements are skipped during the signal processing operation so that starting from the instantaneous picture element 2, the picture elements (−2) and 6 are used. In this situation the picture elements of FIG. 11 are located on a square having three interposed picture elements and lines, respectively.

FIG. 12 shows a less adjacent positioning of the picture elements wherein five picture elements and lines, respectively, are skipped in the square.

FIG. 13 shows picture elements which are located in a circle. This circle combination is obtained by a selection of the picture elements of FIGS. 11 and 12.

By way of example, the square regions and the circle region are shown for deriving the adaptive threshold values. Depending on the picture information structure, the regions described can be chosen to be of such a shape and size that the best possible adaptive threshold value is obtained.

The adaptive horizontal threshold value is obtained for the picture element combination of FIG. 13 in accordance with the following relation: the *maximum* of:

$$|c2(t)-(-c4)(t)|,$$

$$|c2(t)-c8(t)|,$$

$$|c2(t)-\tfrac{1}{2}\{(-y2)(t)+(-g2)(t)\}| \text{ and}$$

$$|c2(t)-\tfrac{1}{2}\{y6(t)+g6(t)\}|$$

is passed.

Herein the adaptive vertical threshold value is obtained in accordance with the following relation: the *maximum* of:

$$|c2(t)-w2(t)|,$$

$$|c2(t)-i2(t)|,$$

$$|c2(t)-\tfrac{1}{2}\{(-y2)(t)+y6(t)\}| \text{ and}$$

$$|c2(t)-\tfrac{1}{2}\{(-g2)(t)+g6(t)\}|$$

is passed.

We claim:

1. A television motion detection arrangement having at least one television picture store for storing digital picture signal values related to picture elements of an interlaced television picture which on display is formed line-sequentially or horizontally and field-sequentially or vertically, a frame period comprising several field periods, and further including a first picture signal value comparison circuit having inputs coupled to at least outputs of the picture store containing the picture signal values for producing picture signal value differences, a first absolute-value circuit coupled to outputs of the first picture signal value comparison circuit for supplying the picture signal value differences, and an adaptive threshold circuit coupled to outputs of the first absolute-value circuit and to a threshold value-adapting circuit, an output of which is coupled to a threshold value input of the adaptive threshold circuit for the supply of a threshold value which depends on the picture signal value differences, exceeding the adaptive threshold value being an indication of motion, characterized in that the adaptive threshold circuit has at least a horizontal or vertical threshold-value input coupled to an output of a horizontal or vertical maximum-value pass circuit, respectively, which forms part of the threshold value-adapting circuit, inputs of which are coupled via a second absolute-value circuit to outputs of a second picture signal value comparison circuit having inputs coupled, both directly and via a signal combining circuit, to outputs of the picture store, said second picture signal value comparison circuit being operative for the horizontal maximum-value pass circuit with, relative to an instantaneous picture element, substantially adjacent picture elements in the line or horizontal direction and picture element values which are derived via the signal combining circuit from the picture elements of one of the substantially adjacent lines in the television picture, and also for the vertical maximum-value pass circuit with, relative to said instantaneous picture element, substantially adjacent picture elements in the field or vertical direction and picture element values which are derived via the signal combining circuit from the picture elements of one of the substantially adjacent lines in the television picture.

2. A television motion detection arrangement as claimed in claim 1, characterized in that the adaptive threshold circuit provided with the adaptive horizontal and vertical threshold values comprises a gate circuit having a logic AND-function so that the detection that there is indeed motion is only obtained if the absolute values of all the picture signal value differences applied for the instantaneous picture element exceed one of the threshold values.

3. A television motion detection arrangement as claimed in claim 1, characterized in that with respect to said horizontal maximum-value pass circuit, said substantially adjacent lines in the television picture are from the instantaneous field period.

4. A television motion detection arrangement as claimed in claim 1, characterized in that with respect to said horizontal maximum-value pass circuit, said substantially adjacent lines in the television picture are from a preceding field period.

5. A television motion detection arrangement as claimed in claim 1, characterized in that with respect to said horizontal maximum-value pass circuit, said substantially adjacent lines in the television picture are from a subsequent field period.

6. A television motion detection arrangement as claimed in claim 1, characterized in that with respect to said vertical maximum-value pass circuit, said substantially adjacent lines in the television picture are from the instantaneous field period.

7. A television motion detection arrangement as claimed in claim 1, characterized in that with respect to said vertical maximum-value pass circuit, said substantially adjacent lines in the television picture are from a preceding field period.

8. A television motion detection arrangement as claimed in claim 1, characterized in that with respect to said vertical maximum-value pass circuit, said substantially adjacent lines in the television picture are from a subsequent field period.

9. A television motion detection apparatus comprising a picture store suitable for supplying picture signal values of picture elements of a preceding and a subsequent television picture, and a dual structure coupled to said picture store, wherein each structure, in combination with said picture store, comprises a television motion detection arrangement as claimed in claim 1 or 2, and wherein outputs of said dual structure are coupled by a logic OR-function to provide detection when there is indeed motion.

* * * * *